US006948752B1

(12) United States Patent
Crow

(10) Patent No.: US 6,948,752 B1
(45) Date of Patent: Sep. 27, 2005

(54) COMBINATION MASTER LINK AND CHAIN SHORTENER

(75) Inventor: Stephan M. Crow, Broken Arrow, OK (US)

(73) Assignee: The Crosby Group, Inc., Tulsa, OK (US)

( * ) Notice: Subject to any disclaimer, the term of this patent is extended or adjusted under 35 U.S.C. 154(b) by 0 days.

(21) Appl. No.: 10/683,095

(22) Filed: Oct. 10, 2003

(51) Int. Cl.[7] .............................. B66C 1/12; F16G 15/12
(52) U.S. Cl. .............................. 294/82.11; 294/82.17; 59/86; 59/93
(58) Field of Search .................... 294/82.11, 82.12, 294/82.13, 82.14, 82.17, 74; 59/85, 86, 90, 59/93; 24/116 R, 129 A, 129 R

(56) References Cited

U.S. PATENT DOCUMENTS

| 1,845,707 | A |   | 2/1932  | Green          |           |
|-----------|---|---|---------|----------------|-----------|
| 2,774,213 | A | * | 12/1956 | Gantz          | 294/82.1  |
| 3,333,412 | A | * | 8/1967  | Rieger         | 59/93     |
| 3,621,651 | A |   | 11/1971 | Gillespie      | 59/85     |
| 3,795,951 | A |   | 3/1974  | Ratcliff       | 24/230.5  |
| 3,817,028 | A | * | 6/1974  | Blackwood      | 59/86     |
| 4,070,823 | A | * | 1/1978  | Schreyer et al.| 294/82.1  |
| 4,176,874 | A |   | 12/1979 | Archer         | 294/78    |
| 4,248,469 | A | * | 2/1981  | Knox           | 294/82.12 |
| 4,330,990 | A | * | 5/1982  | Schreyer       | 59/93     |
| 4,429,526 | A | * | 2/1984  | Rehbein        | 295/82.1  |
| 4,556,246 | A |   | 12/1985 | Millington     | 294/82.11 |
| 4,941,698 | A |   | 7/1990  | Klibert et al. | 294/82.12 |
| 5,775,754 | A |   | 7/1998  | Fredriksson    | 294/82.11 |
| 5,851,040 | A | * | 12/1998 | Fredriksson    | 294/82.11 |
| 5,884,950 | A |   | 3/1999  | Fredriksson    | 24/116    |
| 5,906,032 | A |   | 5/1999  | Fredriksson    | 24/116    |
| 6,019,407 | A |   | 2/2000  | Ohman et al.   | 294/82.14 |
| 6,371,543 | B1|   | 4/2002  | Fujikawa et al.| 294/82.13 |

FOREIGN PATENT DOCUMENTS

| EP | 000092135 | * | 10/1983 | 24/116 R  |
| EP | 331069    | * | 9/1999  | 294/82.11 |
| GB | 870578    |   | 6/1961  |           |

* cited by examiner

Primary Examiner—Dean J. Kramer
Assistant Examiner—Paul T. Chin
(74) Attorney, Agent, or Firm—Head, Johnson & Kachigian

(57) ABSTRACT

A combination master link and chain shortener that can be readily connected to existing closed loop lifting rings. In one preferred embodiment, a bail connects to a lifting mechanism and an elongated body having a pair of opposed ends includes an opening at one end to connect to the bail. A pair of chain shortening cradles are provided, each chain shortening cradle in angular relation to the elongated body. A pair of chain connecting hooks, each receive a chain end link therein. A chain retainer pin retains the chain end links within the connecting hooks. In an alternate embodiment, a bail connects to a lifting mechanism and an elongated body includes a pair of opposed ends with an opening at one end to connect to the bail. A pair of chain shortening cradles are provided with each cradle in angular relation to the elongated body. A pair of receptacles are provided at an opposite end of the body in order to receive a pair of chain end links. A single pin passes through the receptacles in order to lock the pair of chain end links in the receptacles.

6 Claims, 8 Drawing Sheets

COMBINATION MASTER LINK AND CHAIN SHORTENER

BACKGROUND OF THE INVENTION

1. Field of the Invention

The present invention relates to a combination master link and chain shortener device for use in chain link sling assembly applications that can be readily attached to existing closed loop lifting rings.

2. Prior Art

Various types of chain slings are widely known and utilized to secure and to lift loads. In many instances, a main or master link portion connects to a lifting device such as, but not limited to, a hook and in turn lifting equipment such as a crane or block. The main or master link also retains a chain or chains which are, in turn, secured to a load to be lifted. The present device, thus, resides and operates between a lifting device and a load.

Various examples of chain slings utilizing various types of master links are known in the prior art. Likewise, various types of chain shorteners have been devised to adjust the length of the chain or the chains as necessary.

For example, Archer (U.S. Pat. No. 4,176,874) discloses a combination lifting ring with chain shortener features incorporated.

Fredriksson (U.S. Pat. No. 5,775,754) discloses a unitary chain coupler with a pair of projections having vertical seating surfaces for shortening loops at a far end of the coupler and a pair of intermediate chain anchoring projections.

Millington (U.S. Pat. No. 4,556,246) discloses a chain link assembly having two half link portions connected by a pin.

It is, therefore, desirable to provide a combination master link and chain shortener so that the length of the chains are easily adjustable in the field.

It is further desirable to provide a combination master link and chain shortener wherein multiple lengths of chain may be attached to the device quickly and simply in the field.

It is also desirable to provide a combination master link and chain shortener that can be readily separated for connecting to other closed loop lifting rings.

It is also desirable to provide a combination master link and chain shortener having a single chain retaining pin for retaining all chains.

It is also desirable to provide a combination master link and chain shortener reducing the number of fittings normally required with existing designs for chain sling assemblies of more than two legs.

The above references and prior art require an intermediate fitting in order to attach a combination master link and chain shortener to a closed loop main or master link for the express purpose of creating a chain sling assembly of more than two legs. Therefore, it is desirable to provide a combination master link and chain shortener that can be attached directly, without the need for additional special fittings, to a closed loop main or master link.

SUMMARY OF THE INVENTION

The present invention is directed to a combination master link and chain shortener device. In one preferred embodiment, the device includes a bail having a bail opening at one end. A lifting mechanism, such as a hook or a master link, would be connected to the bail. The device also includes an elongated body having a pair of opposed ends. The elongated body has a hinge opening therethrough at one end. The end of the elongated body is received in the bail opening so that a hinge opening receives a hinge pin. The bail, thus, pivots with respect to the elongated body about the hinge pin.

A pair of chain shortening slots are provided in the body between the opposed ends. Each chain shortening slot is in angular relation to the elongated body.

Each chain shortening slot has a thickness generally commensurate with the thickness of the elongated body. Additionally, at the bottom and on both sides of the slot are extending saddles. Each saddle also includes opposed concave recesses to form and orient a chain link placed in the chain shortening slot.

A pair of receptacles are recessed or formed into the elongated body at an opposite end. Each receptacle receives a chain end link. The width of each receptacle is only slightly larger than the width of the end link so that each end link is retained and oriented. A single chain retaining pin passes through each receptacle and through each end link and resides in the elongated body to retain and lock the end links to the body.

Adjacent each receptacle in the body is a link limitation and orientation shoulder. The shoulders orient chain links adjacent the end links and also limit the angular orientation of the chain beyond a desirable degree.

BRIEF DESCRIPTION OF THE DRAWINGS

FIG. 13 illustrates a portion of the device shown in FIGS. 1 through 4 with a chain inserted while

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
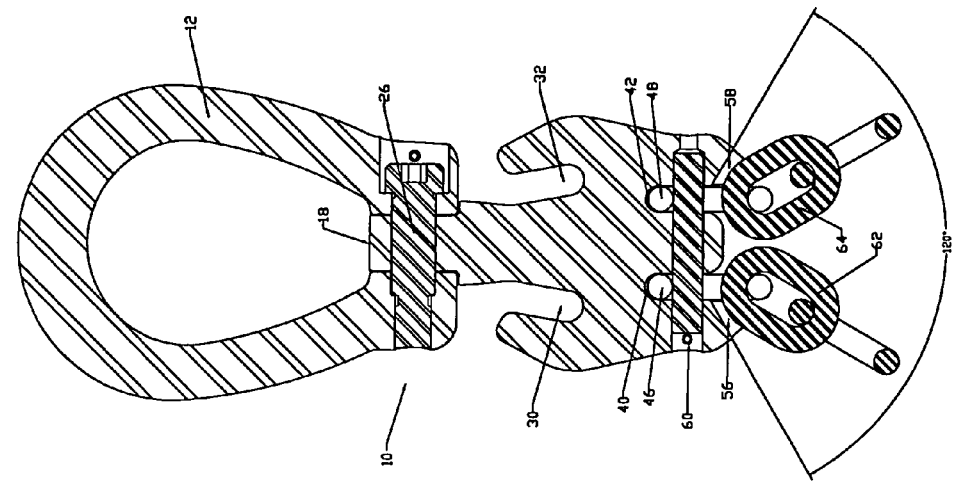
FIG. 1 illustrates a front view of a first preferred embodiment of a combination master link and chain shortener device constructed in accordance with the present invention.
Figure 2:
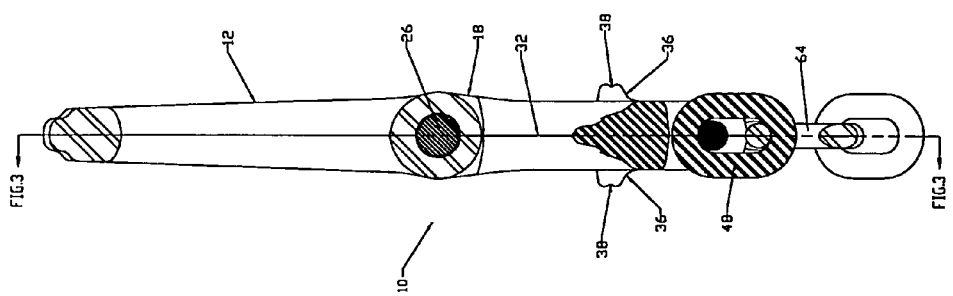
FIG. 2 is a sectional view taken along section line 2—2 of FIG. 1.
Figure 3:
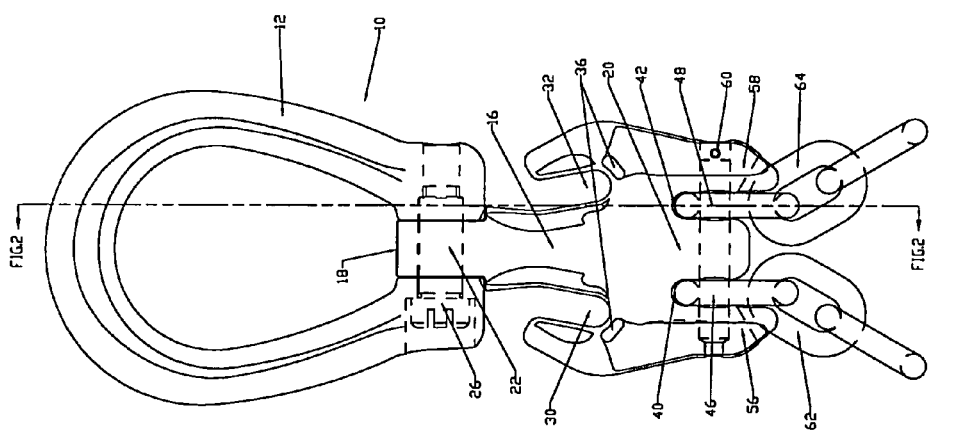
FIG. 3 is a sectional view taken along section line 3—3 of FIG. 2.

Referring to the drawings in detail, FIG. 1 illustrates a front view of a first preferred embodiment of a combination master link and chain shortener 10 constructed in accordance with the present invention, while FIG. 2 illustrates a sectional view taken along section line 2—2 of FIG. 1. FIG. 3 illustrates a sectional view taken along section line 3—3 of FIG. 2. Finally, FIG. 4 is an exploded view of the device 10.

Figure 4:
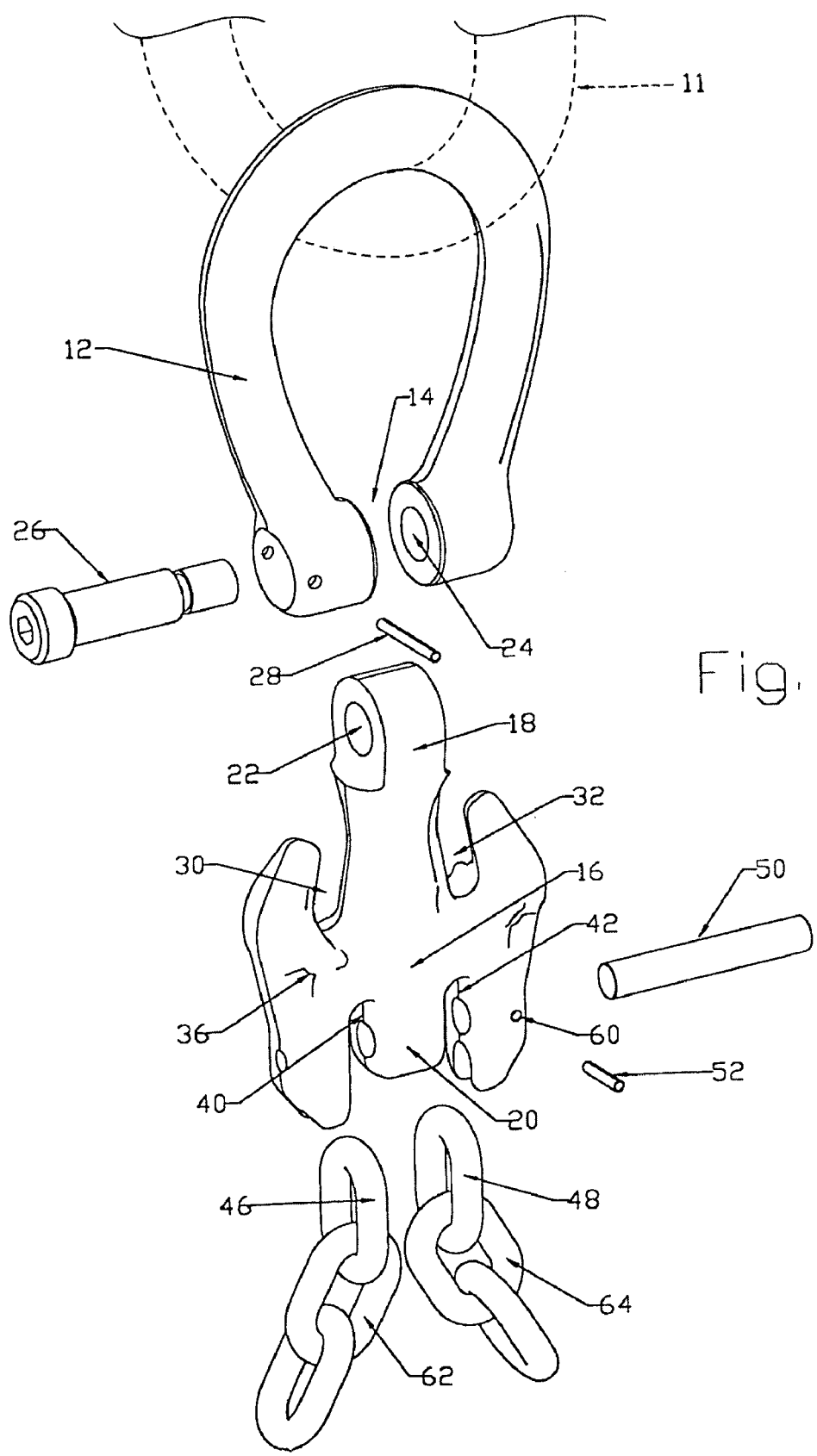
FIG. 4 is an exploded view of the combination master link and chain shortener device shown in FIG. 1.

The device 10 includes a bail 12 having a bail opening 14 at one end thereof as best seen in FIG. 4. A lifting mechanism, such as a hook or a master link 11, would be connected to the bail 12 when in operation.

The device also includes an elongated body 16 having a pair of opposed ends 18 and 20. The elongated body 16 has a hinge opening 22 therethrough at end 18. The end 18 of the elongated body 16 is received in the bail opening 14 so that the hinge opening 22 mates with an opening 24 in the bail to receive a hinge pin 26. Once the hinge pin is in place, a transverse retainer pin 28 resides in a cross-drilled hole in the body and is friction fit therein to retain the hinge pin 26 in place. The bail 12, thus, pivots with respect to the elongated body 16 about the hinge pin 26.

A pair of chain shortening slots 30 and 32 are provided in the body 16 between the opposed ends 18 and 20. Each chain shortening slot is in angular relation to the elongated body. In a preferred embodiment as shown, each chain shortening slot is at approximately a positive angle to the elongated body. It will be understood that other angles may be possible within the spirit and scope of the present invention.

Each chain shortening slot 30 and 32 has a thickness generally commensurate with the thickness of the elongated body 16 as may be observed in FIG. 2. Additionally, at the bottom of each slot there is an extending saddle beyond the thickness of the slots. The saddle is offset at an optimum angle to the shortener slot. This offset decreases the maximum angle that the chain will be from the axis of the saddle supporting surface. This provides optimum strength efficiencies if the chain sling angles are required to be greater or smaller than the supporting surface of the saddle. This offset concept also allows the chain shortener slot to be independent and subsequently a smaller angle relative to the optimum position of the saddle. Thus, the overall width of the elongated body 16 is preferably reduced. Each saddle 36 also includes opposed recesses 38 to increase support to the chain link (not shown) placed in the slot. The recesses are concave and provide longer support to the chain link in the shortener slot. It also increases the interference between the saddle and the chain link that loops over the saddle. These two characteristics result in greater strength efficiencies relative to the minimum breaking strength of the chain.

A pair of receptacles 40 and 42 are recessed or formed into the elongated body 16 at an end 20 opposite the end 18 of the elongated body. Each receptacle 40 and 42 receives a chain end link 46 and 48, respectively. The width of each receptacle 40 and 42 is only slightly larger than the width of the end link 46 and 48 so it is recognized that the correct chain size is retained and oriented. A single retaining pin 50 passes through each receptacle and through each end link 46 and 48 and resides in the elongated body 16 to retain and lock the end links to the body. The single chain retaining pin 50 retains and locks both of the end links in at one time in a simple installation. In the embodiment shown, the single pin 50 is parallel to and planar with the opening 22 in the opposite end of the body and the hinge pin.

A transverse pin 52 resides in a cross-drilled hole 60 in the body and is friction fit therein to retain single pin 50.

Adjacent each receptacle 40 and 42 in the body is a link limitation and orientation shoulder 56 and 58, respectively. In the embodiment shown, the shoulders 56 and 58 provide planar orientation of the chain links 62 and 64, respectively, and also provides a maximum angular indication for chain sling use.

Figure 7:
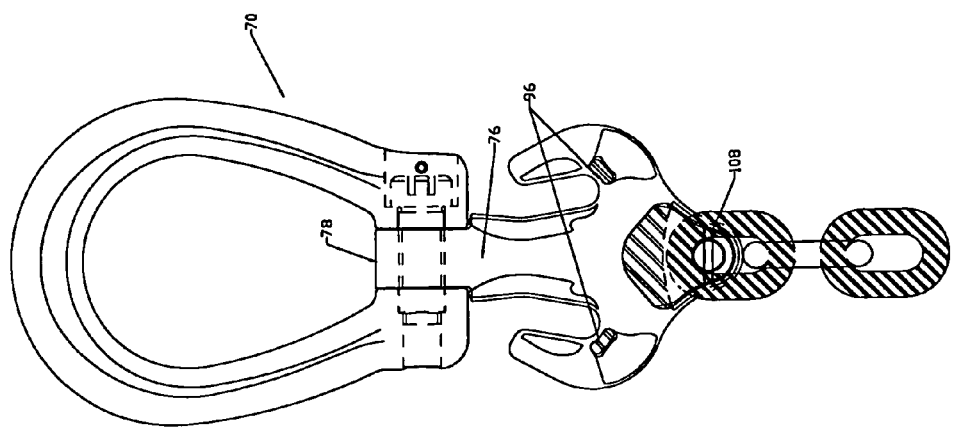
FIG. 7 is a sectional view taken along section line 7—7 of FIG. 6.
Figure 6:
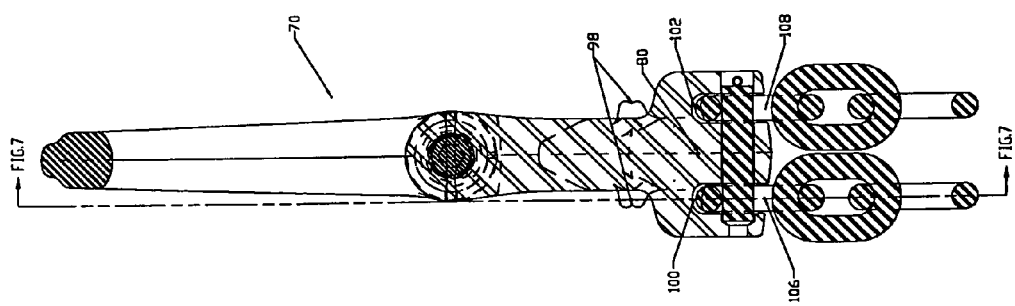
FIG. 6 is a sectional view taken along section line 6—6 of FIG. 5.
Figure 5:
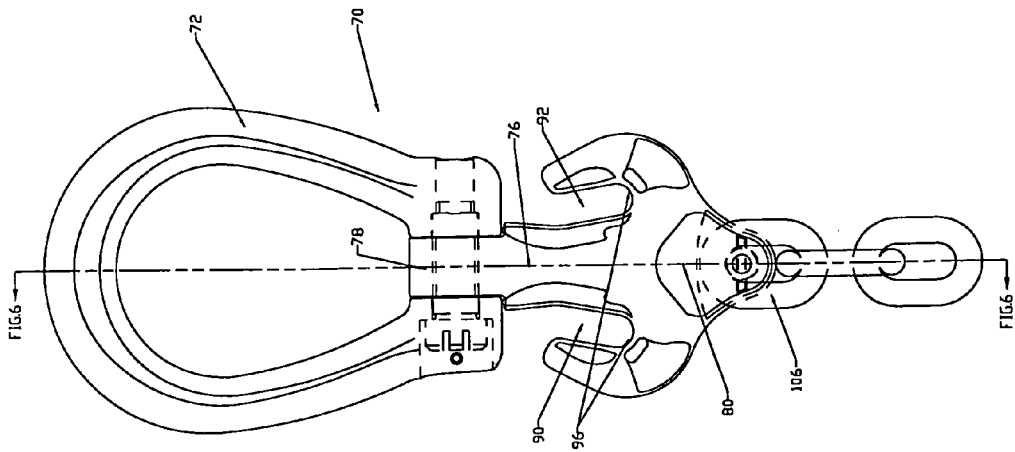
FIG. 5 illustrates a front view of a second preferred embodiment of a combination master link and chain shortener device constructed in accordance with the present invention.

FIG. 5 illustrates a front view of a second preferred embodiment of a combination master link and chain shortener 70 constructed in accordance with the present invention. FIG. 6 illustrates a sectional view taken along section line 6—6 of FIG. 5. FIG. 7 illustrates a sectional view taken along section line 7—7 of FIG. 6. Finally, FIG. 8 illustrates an exploded view of the device 70.

Figure 8:
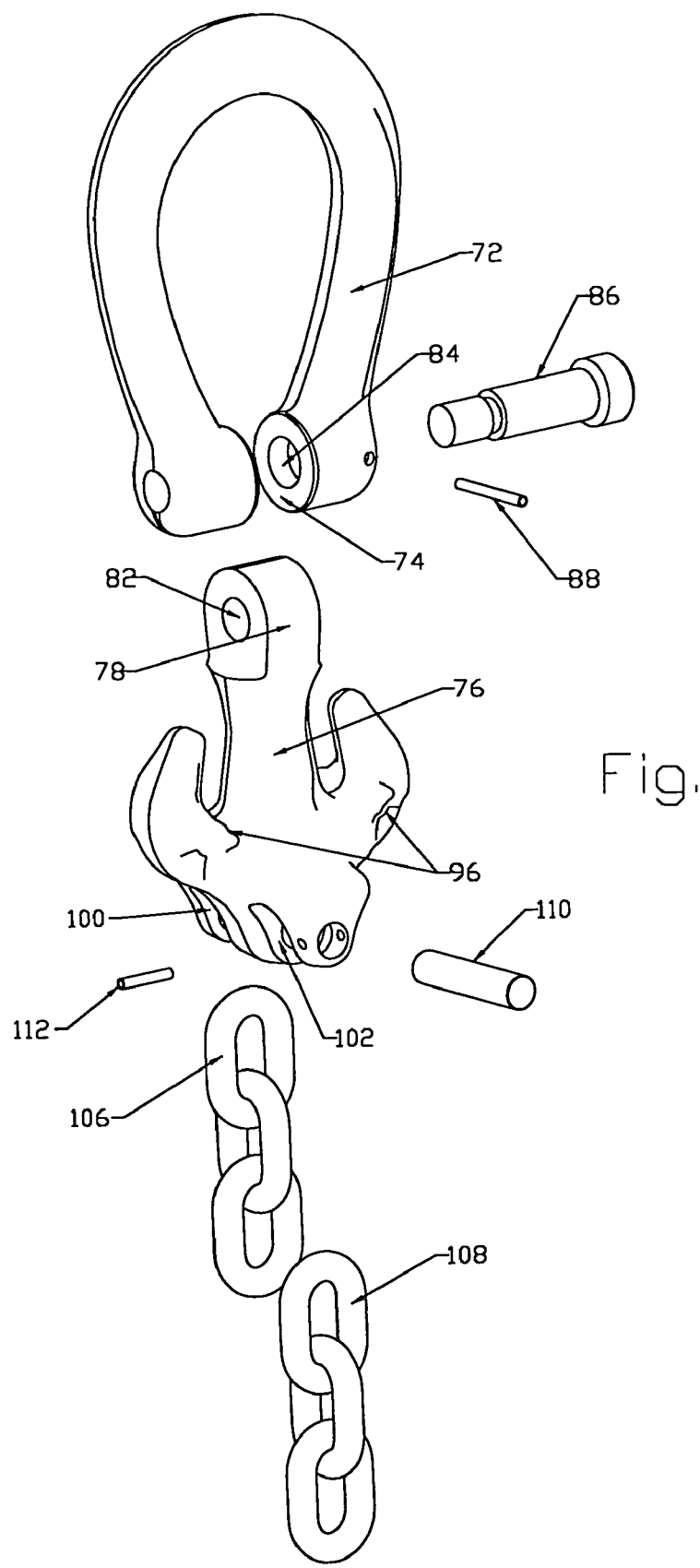
FIG. 8 is an exploded view of the combination master link and chain shortener device shown in FIG. 5.

The device 70 includes a bail 72 having an opening 74 at one end thereof as best seen in FIG. 8. A lifting mechanism, such as a hook or a master link (not shown), would be connected to the bail 72 when in operation. The device 70 also includes an elongated body 76 having a pair of opposed ends 78 and 80. The elongated body 76 has a hinge opening 82 therethrough at end 78. The end 78 of the elongated body 76 is received in the bail opening 74 so that the hinge opening 82 mates with an opening 84 in the bail to receive a hinge pin 86. Once the hinge pin is in place, a transverse retainer pin 88 resides in a cross-drilled hole in the body and is friction fit therein to retain the hinge pin 86 in place. The bail 72, thus, pivots with respect to the elongated body about the hinge pin 86.

A pair of chain shortening slots 90 and 92 are provided in the body 76 between the opposed ends 78 and 80. Each chain shortening slot is in angular relation to the elongated body. In one preferred embodiment as shown, each chain shortening slot 90 and 92 are at a positive angle to the elongated body.

Each chain shortening slot 90 and 92 has a thickness generally commensurate with the thickness of the elongated body 76 as may be readily observed in FIG. 6. Additionally, the bottom of each slot includes an extending saddle 96 having a thickness larger than the thickness of the slot. The saddle is offset at an optimum angle to the shortener slot. This offset decreases the maximum angle that the chain will be from the axis of the saddle supporting surface. This provides optimum strength efficiencies if the chain sling angles are required to be greater or smaller than the supporting surface of the saddle. This offset concept also allows the chain shortener slot to be independent and subsequently a smaller angle relative to the optimum position of the saddle. Thus, the overall width of the elongated body 76 is preferably reduced. Each saddle 96 also includes opposed recesses 98. The recesses are concave and provide longer support to the chain link in the shortener slot. It also increases the interference between the saddle and the chain link that loops over the saddle. These two characteristics result in greater strength efficiencies relative to the minimum breaking strength of the chain.

A pair of receptacles 100 and 102 are recessed or formed into the elongated body 76 at an end 80 opposite the end 78 of the elongated body. Each receptacle 100 and 102 receives an end link 106 and 108. The width of each receptacle 100 and 102 is only slightly larger than the width of the end link 106 and 108 so it is recognized that the correct chain size is retained and oriented. A single chain retaining pin 110 passes through each receptacle and through each end link and resides in the elongated body 76 to retain and lock the end links to the body. The single chain retaining pin 110 retains and locks both of the end links in at one time in a simple installation. In the embodiment shown in FIGS. 5 through 8, the single pin is parallel but rotated at a 90° angle to the opening 82 in the opposite end of the body.

A transverse pin 112 resides in a cross-drilled hole in the body and is friction fit therein to retain the single pin 110.

Figures 9, 10, 11:
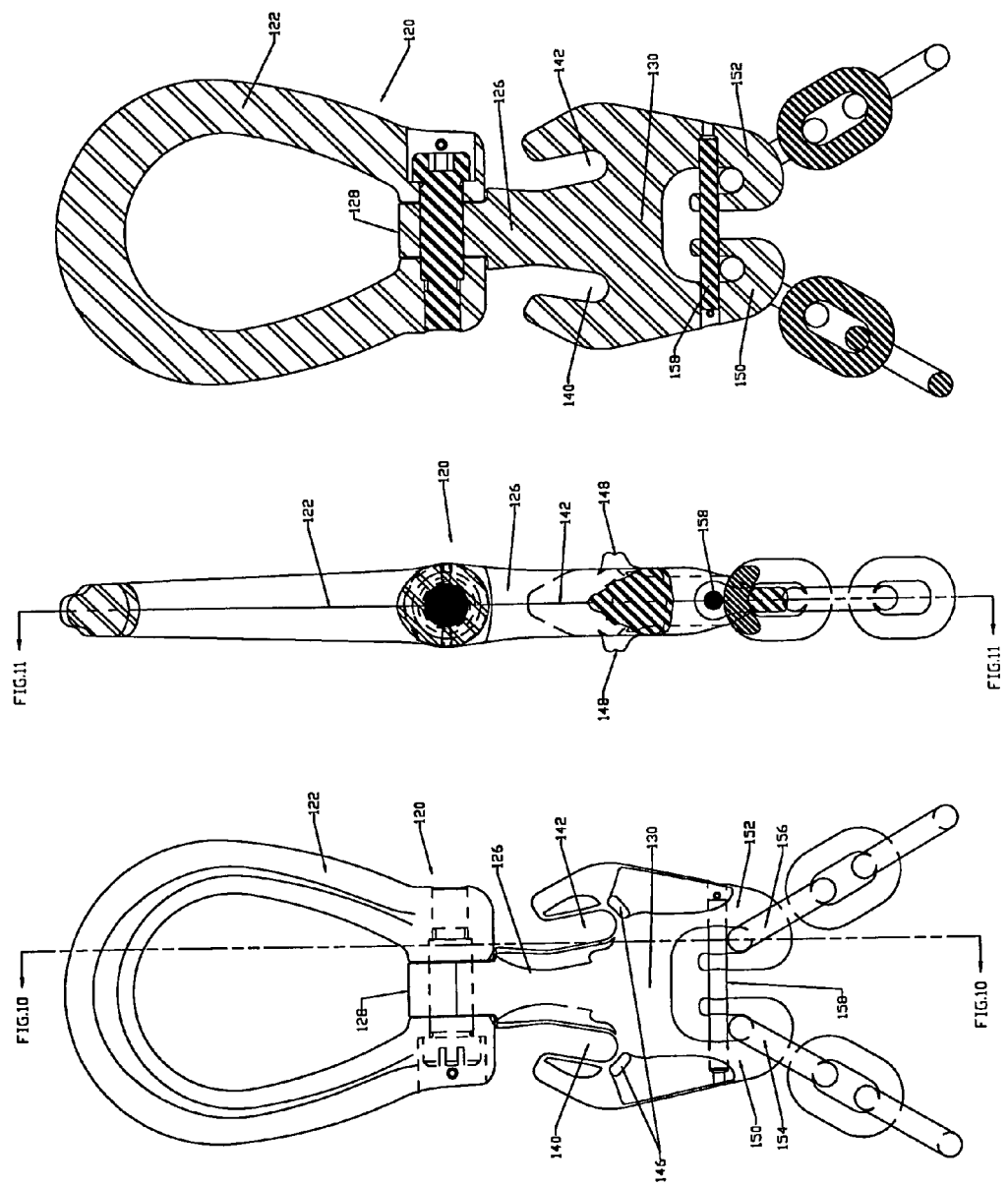
FIG. 9 illustrates a front view of a third preferred embodiment of a combination master link and chain shortener device constructed in accordance with the present invention.
FIG. 10 is a sectional view taken along section line 10—10 of FIG. 9.
FIG. 11 is a sectional view taken along section line 11—11 of FIG. 10.
Figure 12:
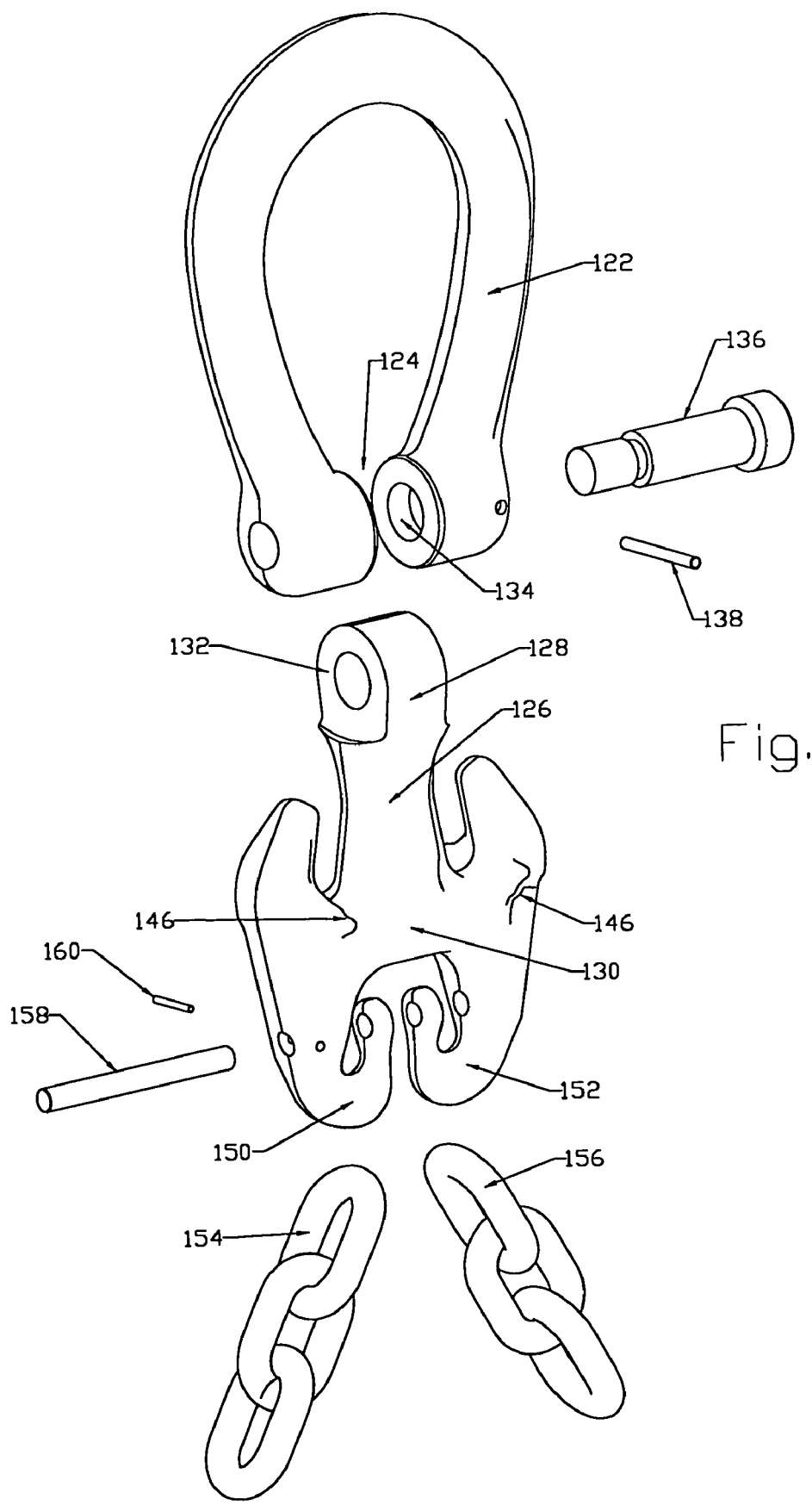
FIG. 12 is an exploded view of the combination master link and chain shortener device shown in FIG. 9.

FIG. 9 illustrates a front view of a third preferred embodiment of a combination master link and chain shortener 120 constructed in accordance with the present invention. FIG. 10 illustrates a sectional view taken along section line 10—10 of FIG. 9. FIG. 11 illustrates a sectional view taken along section line 11—11 of FIG. 10. Finally, FIG. 12 illustrates an exploded view of the device 120. The device 120 includes a bail 122 having a bail opening 124 at one end thereof as best seen in FIG. 12. A lifting mechanism, such as a hook or a master link (not shown), would be connected to the bail 122 when in operation. The device also includes an elongated body 126 having a pair of opposed ends 128 and 130. The elongated body 126 has a hinge opening 132 therethrough at end 128. The end 128 of the elongated body 126 is received in the bail opening 124 so that the hinge opening 132 mates with an opening 134 in the bail to receive a hinge pin 136. Once the hinge pin is in place, a transverse retainer pin 138 resides in a cross-drilled hole in the body and is friction fit therein to retain the hinge pin in place. The bail 122, thus, pivots with respect to the elongated body 126 about the hinge pin 136.

A pair of chain shortening slots 140 and 142 are provided in the body 126 between the opposed ends 128 and 130. Each chain shortening slot is in angular relation to the elongated body. In a preferred embodiment as shown, each chain shortening slot is at approximately a positive angle to the elongated body.

Each chain shortening slot has a thickness generally commensurate with the thickness of the elongated body 126 as may be readily observed in FIG. 10. Additionally, at the bottom of each slot there is an extending saddle 146 having a thickness larger than the thickness of the slot. The saddle is offset at an optimum angle to the shortener slot. This offset decreases the maximum angle that the chain will be from the axis of the saddle supporting surface. This provides optimum strength efficiencies if the chain sling angles are required to be greater or smaller than the supporting surface of the saddle. This offset concept also allows the chain shortener slot to be independent and subsequently a smaller angle relative to the optimum position of the saddle. Thus, the overall width of the elongated body 126 is preferably reduced. Each saddle 146 also includes opposed recesses 148 to increase support to the chain link (not shown) placed in the slot. The recesses are concave and provide longer support to the chain link in the shortener slot. It also increases the interference between the saddle and the chain link that loops over the saddle. These two characteristics result in greater strength efficiencies relative to the minimum breaking strength of the chain.

A pair of chain connecting hooks 150 and 152 are at end 130 of the elongated body. Each hook 150 and 152 receives a chain end link 154 and 156 therein. The hooks are aligned with and face each other inwardly.

A single retaining pin 158 passes through each hook 150 and 152 and retains and locks both of the chain end links in at one time in a simple procedure. A transverse pin 160 resides in a cross-drilled hole in the body and is friction fit therein to retain the pin 158 in place.

In order to assemble for use, chain end link 154 and 156 are placed or received on hooks 150 and 152. The single retaining pin 158 is then inserted into the body and through each hook to retain the chain end links. Finally, the transverse pin is inserted or forced in to retain the single retaining pin.

In the event the chain length is to be adjusted, links are inserted in the slot or slots.

Figure 13:
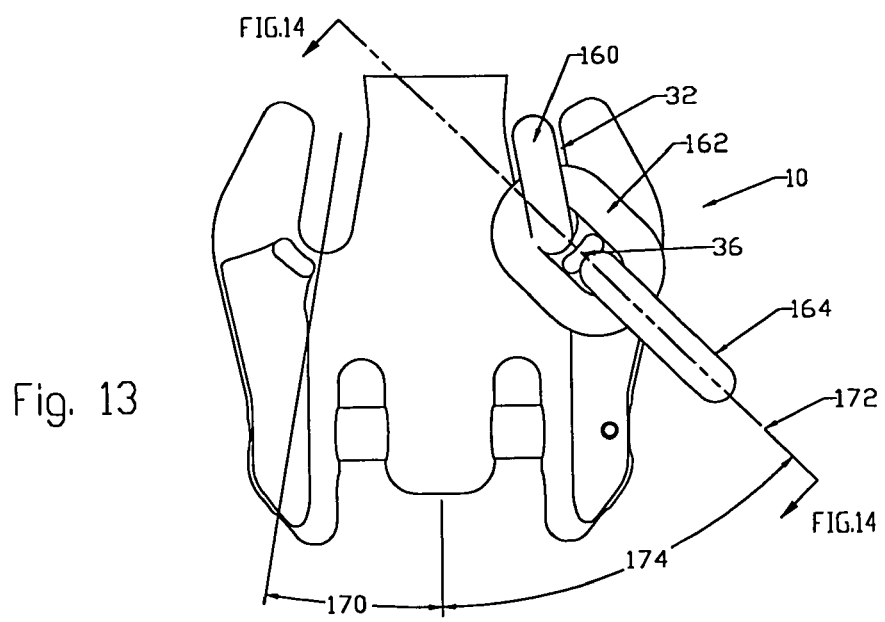
Figure 14:
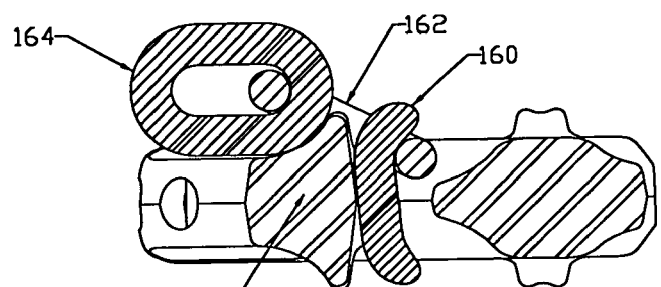
FIG. 14 illustrates a section view taken along section line 14—14 of FIG. 13.
Figure 15A:
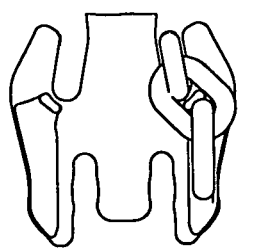
FIGS. 15A through 15D illustrate possible chain angles.
Figure 15B:
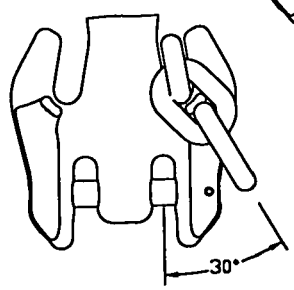
Figure 15C:
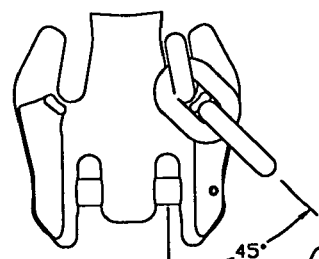
Figure 15D:
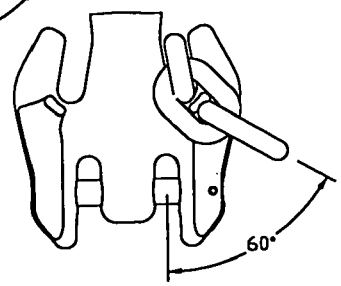

FIG. 13 illustrates a portion of the device 10 shown in FIGS. 1 through 4 with a chain inserted into chain shortener slot 32. Chain link 160 is shown residing in the slot 32. Adjacent link 162 is connected to link 160 and fits over extending saddle 36. Chain link 164 is connected to link 162 and extends therefrom. Arrow 170 shows the angle of the slots to the elongated body. Dashed line 172 shows a section as illustrated in FIG. 14 while arrow 174 illustrates a possible, optimum chain angle for the chain and in particular link 164. FIGS. 15A through 15D illustrate possible chain angles extending from a 0° angle to the body as shown in FIG. 15A up to a 60° angle shown in FIG. 15D.

Figure 17:
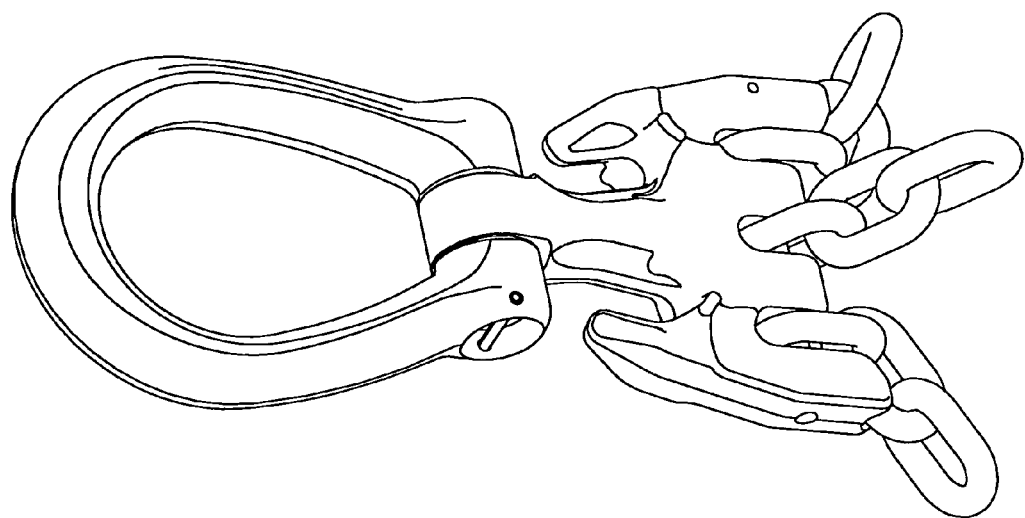
FIGS. 16 and 17 illustrate further contemplated variations.
Figure 16:
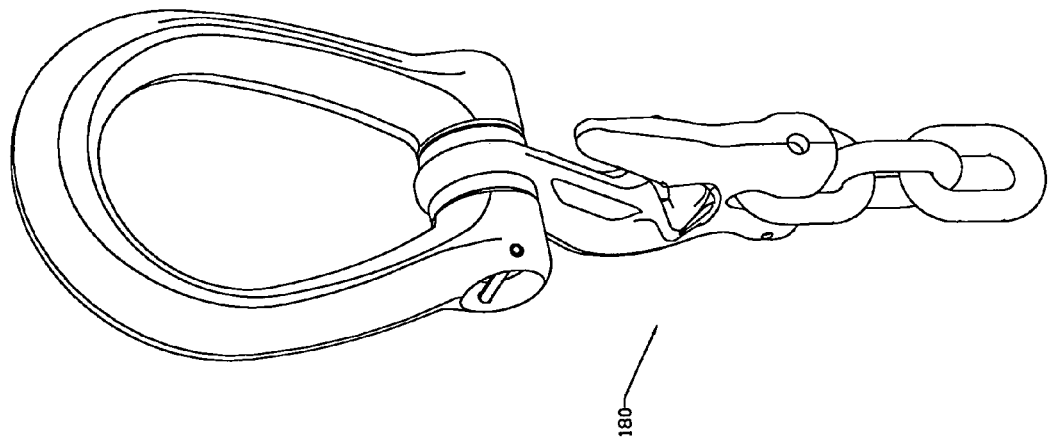

FIGS. 16 and 17 illustrate variations contemplated within the spirit and scope of the present invention. FIG. 16 illustrates an embodiment 180 having a single chain shortening slot and a single recess for retaining a chain end. FIG. 17 illustrates an embodiment having multiple recesses for retaining multiple chain ends, in this case three recesses for receiving three chain ends. In each case, a single retaining pin is utilized to retain each chain end.

Whereas, the present invention has been described in relation to the drawings attached hereto, it should be understood that other and further modifications, apart from those shown or suggested herein, may be made within the spirit and scope of this invention.

What is claimed is:

1. A combination master link and chain shortener replacement device which comprises:

an open loop bail having a bail opening, said bail suspended from a lifting mechanism and readily attachable to said lifting mechanism;

an elongated body having a pair of opposed ends with one said end connected to said bail at said bail opening;

at least two chain shortening slots in said body, each said slot in angular relation to said elongated body;

at least a pair of chain end link receptacles at an opposite end of said body having a chain end link in each said receptacle; and a single retaining pin passing through each said chain end link and each said receptacle to lock each said chain end link in said receptacle.

2. A combination master link and chain shortener replacement device as set forth in claim 1 wherein said single retaining pin passes through said chain end link receptacles of said body parallel to said bail opening at said one end of said body connected to said bail.

3. A combination master link and chain shortener as set forth in claim 1 wherein said single retaining pin is perpendicular to a hinge opening at said one end of said body.

4. A combination master link and chain shortener replacement device as set forth in claim 1 wherein each said chain shortening slot has a thickness and each said slot includes an extending saddle having a thickness larger than said thickness of said slot.

5. A combination master link and chain shortener replacement device as set forth in claim 4 wherein each saddle includes an extending end having a concave recess to provide maximum support to promote strength of a chain link therein.

6. A combination master link and chain shortener replacement device as set forth in claim 1 including a link limitation and orientation shoulder in said body adjacent each chain end link receptacle.

* * * * *